US008375387B2

(12) United States Patent
Hicks et al.

(10) Patent No.: US 8,375,387 B2
(45) Date of Patent: Feb. 12, 2013

(54) PRODUCT INDEPENDENT ORCHESTRATION TOOL

(75) Inventors: Matt Hicks, Morrisville, NC (US);
Brenton Leanhardt, Raleigh, NC (US);
Christopher Alfonso, Raleigh, NC (US);
Chris MacLeod, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1030 days.

(21) Appl. No.: 12/156,280

(22) Filed: May 30, 2008

(65) Prior Publication Data

US 2009/0300619 A1  Dec. 3, 2009

(51) Int. Cl.
*G06F 9/46* (2006.01)
*G06F 9/455* (2006.01)

(52) U.S. Cl. .......................................... 718/100; 718/1
(58) Field of Classification Search .............. 718/1, 104, 718/102; 714/6, 11, 24; 717/120
See application file for complete search history.

(56) References Cited

U.S. PATENT DOCUMENTS

| 7,103,881 | B2 | 9/2006 | Stone |
| 7,181,731 | B2 | 2/2007 | Pace |
| 2002/0053044 | A1 | 5/2002 | Gold et al. |
| 2004/0172574 | A1 | 9/2004 | Wing et al. |
| 2004/0221146 | A1* | 11/2004 | Baumann ........................... 713/1 |
| 2005/0144617 | A1 | 6/2005 | Chefalas et al. |
| 2006/0122937 | A1 | 6/2006 | Gatto et al. |
| 2006/0143517 | A1* | 6/2006 | Douceur et al. ................. 714/21 |
| 2006/0248527 | A1* | 11/2006 | Jaeckel et al. ...................... 718/1 |
| 2006/0271395 | A1* | 11/2006 | Harris et al. ........................ 705/1 |
| 2007/0044100 | A1 | 2/2007 | Panesar et al. |
| 2007/0258388 | A1* | 11/2007 | Bose .............................. 370/254 |
| 2008/0098462 | A1 | 4/2008 | Carter |
| 2008/0104588 | A1* | 5/2008 | Barber et al. ...................... 718/1 |
| 2008/0120080 | A1 | 5/2008 | Nasle |
| 2008/0120350 | A1 | 5/2008 | Grabowski et al. |
| 2008/0155223 | A1* | 6/2008 | Hiltgen et al. ................. 711/173 |
| 2008/0163171 | A1* | 7/2008 | Chess et al. .................... 717/120 |
| 2008/0163210 | A1 | 7/2008 | Bowman et al. |
| 2008/0222234 | A1* | 9/2008 | Marchand ..................... 709/201 |
| 2008/0244028 | A1 | 10/2008 | Le et al. |
| 2008/0271017 | A1* | 10/2008 | Herington ......................... 718/1 |
| 2008/0307414 | A1* | 12/2008 | Alpern et al. ..................... 718/1 |

(Continued)

OTHER PUBLICATIONS

Red Hat, Inc. Non-Final Office Action for U.S. Appl. No. 12/156,306 mailed Aug. 10, 2011.

(Continued)

*Primary Examiner* — Thomas Lee
*Assistant Examiner* — Phil Nguyen
(74) *Attorney, Agent, or Firm* — Lowenstein Sandler LLP (57) ABSTRACT

A self-replicating machine includes a virtualization tool, a provisioning tool, and a configuration tool, stored in a distributable self-contained repository of the machine. The machine is able to automatically rebuild itself solely from the tools stored in the distributable self-contained repository. The virtualization tool is configured to build one or more virtual machines on the machine. Each virtual machine has a corresponding operating system and environment. The provisioning tool is configured to provision the one or more virtual machines. The configuration tool is to configure the one or more provisioned virtual machines. A custom configuration management tool further customize and configure the physical machine for specific users. A configuration management tool is configured to orchestrate and automate a deployment process, and to interface with an underlying product having a corresponding functionality.

20 Claims, 8 Drawing Sheets

U.S. PATENT DOCUMENTS

2009/0037553 A1 2/2009 Yuan et al.
2009/0300610 A1 12/2009 Hicks et al.
2009/0300619 A1 12/2009 Hicks et al.

OTHER PUBLICATIONS

Lee Congdon, "Provisioning our New Middleware Architecture", Apr. 29, 2008, http://www.press.redhat.com/2008/04/29/provisioning-our-new-middleware-architecture/.

Red Hat, Inc. Final Office Action for U.S. Appl. No. 12/156,306, mailed Dec. 29, 2011.

Red Hat, Inc. Advisory Action for U.S. Appl. No. 12/156,306, mailed Mar. 6, 2012.

Red Hat, Inc. NonFinal Office Action for U.S. Appl. No. 12/156,279, mailed Dec. 6, 2011.

* cited by examiner

PRODUCT INDEPENDENT ORCHESTRATION TOOL

CROSS-RELATED APPLICATIONS

The present application is related to co-pending patent application Ser. No. 12/156,306, filed May 30, 2008, entitled "Self-Replicating Machines", and co-pending patent application Ser. No. 12/156,279, filed May 30, 2008, entitled "Combining system Blueprints, Functional Layer, and Software Bits in parallel development of machines".

TECHNICAL FIELD

Embodiments of the present invention relate to machines, and more specifically to machines capable of replicating themselves.

BACKGROUND

An efficient IT architecture strives to build decoupled, reproducible, highly available systems that streamline business operations. Incremental improvement is one strategy used to deliver functionality to an organization in a timely manner. The caveat to this approach is that no one seems to be able to effectively accomplish the iterations outside a small sliver of the overall infrastructure. This is due to lack of reproducibility and testability of an entire architecture. If the systems cannot be reproduced in any environment, they cannot be effectively iterated upon. Once modified, if those system changes cannot be efficiently tested for regression, the cost of iterative changes spirals out of control. As such, a distributable, automated provisioning and configuration framework is necessary to reproduce systems in any environment.

Furthermore, agile development is a concept that focuses on an iterative refinement and delivery. All too often agile development also drives quick development changes into production that are not maintainable over the entire lifecycle. This causes an exponential number of unmaintainable systems to be introduced that eventually cripple the infrastructure's ability to scale. Among other factors that cause a lack of focus on the entire lifecycle is the inability to reproduce and test entire infrastructures. The output of this oversight leads to scenarios in which migrating applications between segregated and controlled environments yield unexpected test failures, invalidation of quality assurance efforts, data corruption, etc.

Therefore a need exists for a system that can replicate and built itself automatically in any environment. The side-effect of reproducing any system in an infrastructure is that systems can be recovered using the same framework—this not only drastically improves tactical resilience but also longer term data continuity and disaster recovery strategies.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for self-replicating a machine. In one embodiment, a self-replicating machine includes a virtualization tool, a provisioning tool, and a configuration tool, stored in a distributable self-contained repository of the machine. The machine is able to automatically rebuild itself solely from the tools stored in the distributable self-contained repository. The virtualization tool is configured to build one or more virtual machines on the machine. Each virtual machine has a corresponding operating system and environment. The provisioning tool is configured to provision the one or more virtual machines. The configuration tool is to configure the one or more provisioned virtual machines. A custom configuration management tool further customize and configure the physical machine for specific users. A configuration management tool is configured to orchestrate and automate a deployment process, and to interface with an underlying product having a corresponding functionality.

Figure 1:
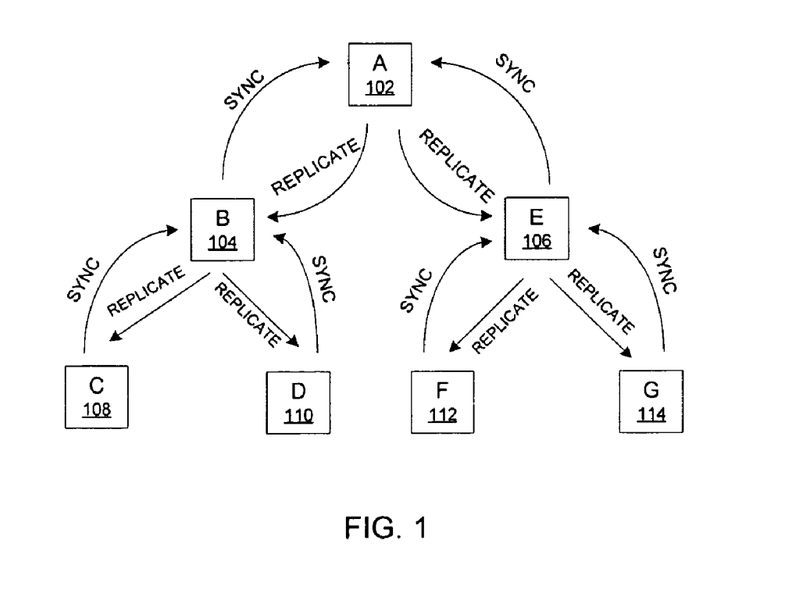
FIG. 1 illustrates a block diagram of one embodiment of a system architecture of self-replicating machines.

FIG. 1 illustrates a block diagram of one embodiment of a system architecture of self-replicating machines. In one embodiment, machine 102 includes a repo machine. Repo machines are self-contained provisioning, configuration, and artifact stores. They are capable of creating all other machine types, including other repo machines. Once a repo machine has everything is needs to stand on its own, it severs the tie with its parent. The components of repo machine 102 are described in more detail with respect to FIGS. 2 and 3. In another embodiment, these machines are Unix-based systems, or Linux-based systems.

In accordance with another embodiment, machine 102 may include other types of machines such as a host machine, a web-proxy machine, an LDAP machine, or a development machine. Those of ordinary skills in the art will recognize that other types of machines exist.

A host machine is used to host virtual guests. It provides a graphical user desktop, automated NFS home directories, a Kerberos login, Xen virtualization.

A development machine is an aggregation of several machine types.

FIG. 1 illustrates an architecture where every single machine is self-replicable and thus knows how to build itself only from the files in the file system. In one embodiment, one machine includes a repo machine that are self-contained provisioned, configured, and artifact store. From a repo machine, other types of machines can be created. All that is needed to replicate is to move or copy the repository of a repo machine to another. The other machine can build itself from there. The repository of machine A 102 has been replicated to machines B 104, and machine E 106. These machines B 104, and E 106 are capable of rebuilding themselves. The repository of machine B 104 has been replicated to machine C 108 and machine D 110. The repository of machine E 106 has been replicated to machine F 112 and machine G 114. Each of these machines D 108, D 110, F 112, and G114 can rebuild themselves from the replicated repository.

In another embodiment, architecture of FIG. 1 allows for merging or synchronizing any changes made from one machine to the parent machines. For example, any modifications to machine C 108 may be synced back to machine B 104 and machine A 102, and to the other machines E 106, machine F 112, and machine G 114.

Figure 2:
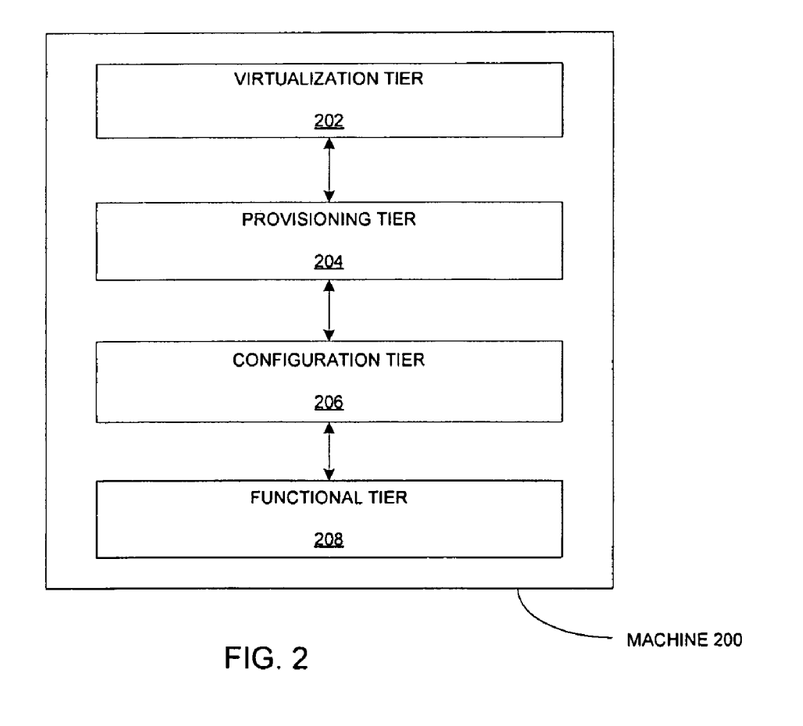
FIG. 2 illustrates a block diagram of one embodiment of an architecture of a self-replicating machine.

FIG. 2 illustrates a block diagram of one embodiment of an architecture of a self-replicating machine 200. In one embodiment, machine 200 includes a virtualization tier 202, a provisioning tier 204, a configuration tier 206, and a functional tier 208.

Figure 3:
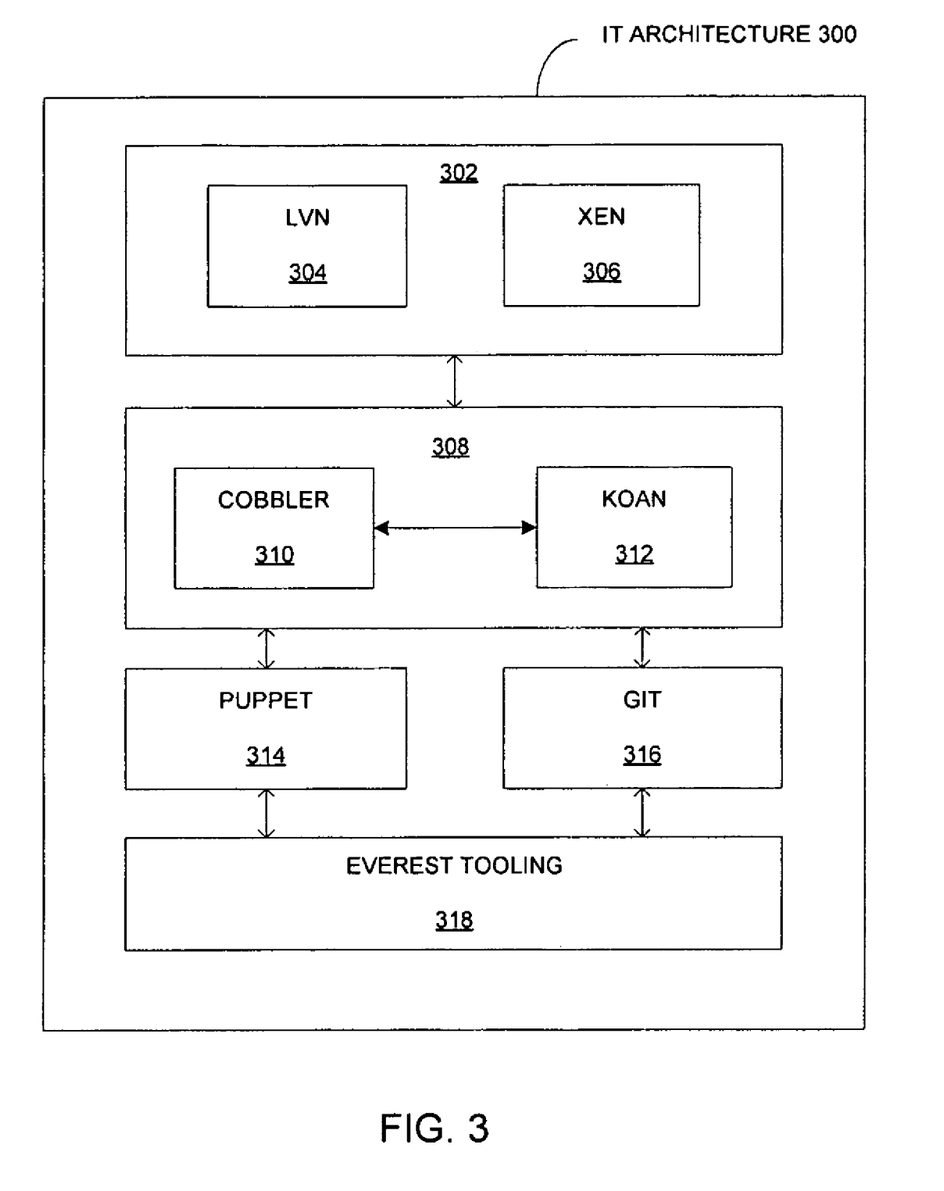
FIG. 3 illustrates a block diagram of one embodiment of architecture components of a self-replicating machine.

Provisioning tier 204 allows for loading the appropriate software (operating system, device drivers, middleware, and applications), and customizing and configuring the system and the software to make it ready for operation. FIG. 3 illustrates one embodiment of a provisioning tier 308. Cobber 310 and Koan 312 are tools that can be used to provision a machine. Cobbler 310 is a provisioning and update server that supports deployments via network booting, virtualization, and reinstalls of existing systems. A significant advantage of Cobbler is that it integrates multiple technologies and reduces the need for the user to understand the details of each. The update features of Cobbler integrate yum minoring and kickstart.

Provisioning tier 204 allows for loading the appropriate software (operating system, device drivers, middleware, and applications), and customizing and configuring the system and the software to make it ready for operation. FIG. 3 illustrates one embodiment of a provisioning tier 302. Cobber 310 and Koan 312 are tools that can be used to provision a machine. Cobbler 310 is a provisioning and update server that supports deployments via network booting, virtualization, and reinstalls of existing systems. A significant advantage of Cobbler is that it integrates multiple technologies and reduces the need for the user to understand the details of each. The update features of Cobbler integrate yum mirroring and kickstart.

Koan 312, which is an acronym for "Kickstart over a Network", is an emerging technology that configures machines from remote Cobbler servers. Koan also enables the use of virtualization and re-installs from a Cobbler server. When launched, it requests install information from the server and creates a virtual guest or replaces the machine it is running on. Cobbler 310 and Koan 312 are described in more detail with respect to FIGS. 4 and 5. Both these tools can be used as the foundation for deployment of systems complying with a new architecture. A complete development server can be quickly built and deployed with no intervention. The provisioning solution significantly reduces an administrator's time to deliver a development solution and to deploy systems in the production environment.

With the introduction of virtualization, entire environments can be rebuilt easily. However, there is a fair amount of complexity involved in doing so. A bootstrapping tool automates the process of wiring the machine up to Puppet, a configuration tool described below. There are essentially two ways of using everest-bootstrap. The first method is to allow the bootstrapping process to manage the provisioning and configuration of the machine. The second method is to allow only the configuration of an already provisioned machine. The second method allows the same configuration process to occur even if the provisioned machines are provided and the user doesn't have control of the underlying operating system.

Another function of the bootstrapping tool is to facilitate wiring up network connectivity. In one embodiment, the bootstrapping tool can coordinate registration with Dynamic DNS systems to allow the machines to be pre-configured with network connectivity to each other. The bootstrapping tool also guides the user through the process of setting parameters to be used by Puppet for configuration.

The required RPMs should already be installed on any machine already bootstrapped in the Everest environment. This is useful for the—config-only mode. However, if Everest machines are to be installed in a virtualized environment, the Everest Host machine needs to be set up. That machine type comes with everest-bootstrap already installed.

The bootstrapping tool does not need any parameters. Running the program will guide the user through the bootstrap process. The following in an example of an execution of the bootstrap program:

bootstrap
Enter your repository machine name: test
To see a description of these machine types visit: http://test-repo.usersys.redhat.com:8106/machine_types.html
1. jboss
2. jboss-proxy
3. jboss-mysql
4. jboss-dev
5. repo
6. rails
7. host
8. ldap
Select your machine type: 4
Enter your kerberos username: bleanhar
Configure this machine with Red Hat DDNS? (y/n)
y
Do you know the DDNS hash for this machine? (y/n)
n
Enter your kerberos password to setup DDNS: *********
Fetching DDNS hash . . .
Hash not found for bleanhar-test-jboss-dev
Requesting a new hash
Fetching DDNS hash . . .
1. LargeGuest-RHEL5U1-i386
2. NormalGuest-F8-i386
3. NormalGuest-RHEL5U1-i386
4. SmallGuest-RHEL5U1-i386
Select your cobbler profile (This determines the OS): 3
Now you need to enter some parameters what will be used to configure this machine.
Most of the defaults will work out fine for development.
Description: The puppetmaster used for all configuration. If you are provisioning a Repo machine, this should be it's FQDN
Enter value for puppetserver: |test-repo.usersys.redhat.com|
Description: server used for syslogd. Another safe value is the FQDN of an Everest host machine.
Enter value for logserver: |localhost|
Description: The cobbler server to configure for all yum dependencies
Enter value for cobbler: |test-repo.usersys.redhat.com|
Description: This is default user. If any work cannot be performed system-wide it will be done for this user
Enter value for user: |it|
Description: The environment this machine will be configured for.

Eventually others will be supported by for now the default value is what you want.
Enter value for env: |sandbox|
Description: The machine hosting the bare git repositories for this machine. This fact is also used at bootstrap time.
Enter value for gitserver: |test-repo.usersys.redhat.com|
Description: The machines running the jboss apps context. This can be a comma separated list if you want to proxy multiple machines or it can be a single machine.
Enter value for jboss_apps_hosts: |test-jboss.usersys.redhat.com|
Description: The machines running the jboss apps context. This can be a comma separated list if you want to proxy multiple machines or it can be a single machine.
Enter value for jboss_wapps_hosts: |test-jboss.usersys.redhat.com|
Description: The machines running the jboss apps context. This can be a comma separated list if you want to proxy multiple machines or it can be a single machine.
Enter value for jboss_wsvc_hosts: |test-jboss.usersys.redhat.com|
Description: The machines running the jboss apps context. This can be a comma separated list if you want to proxy multiple machines or it can be a single machine.
Enter value for jboss_svc_hosts: |test-jboss.usersys.redhat.com|
Description: Maven repo used for maven dependencies
Enter value for maven_repo: |test-repo.usersys.redhat.com|
Description: The MySQL server where JBoss Messaging persists messages.
Enter value for messaging_server: |test-jboss.usersys.redhat.com|
Description: The MySQL server where the JBossESB message datastore resides.
Enter value for datastore_server: |test-jboss.usersys.redhat.com|
Description: Multicast address used for hajndi, tree caches, etc. All machines in the cluster must use the same adddress. It MUST be unique across clusters.
Enter value for multicast_address: |228.1.2.6|
Description: Apache proxy for the tomcat stack. Uses mod_proxy_ajp and is suitable for development. This fact also represents the publicly available redhat.com machine.
Enter value for proxy: |test-jboss-dev.usersys.redhat.com|
Description: The type of Mysql server. The default is the only type suitable for development at the moment
Enter value for mysql_type: |standalone|
Description: Server ID for MySQL Replication. The default is fine if you are using a standalone mysql type.
Enter value for mysql_server_id: |1|

When using the bootstrap wizard, the user will be asked a series of questions. The answers are used as parameters for configuring machines. These parameters live server side and are accessible via the bootstrapping daemon. The bootstrapping daemon is a simple web app that serves as the canonical source of machine information. These parameters can be used anywhere a normal variable can be used in Puppet manifests and templates. Some values are client specific such as: what cobbler server a node looks to for dependencies, what machines a particular apache will proxy, what server should be considered it's upstream git repo. Often a parameter post bootstrap is changed when the machine is pointed at a different Puppetmaster or Cobbler server.

After successfully running the bootstrapping tool, a Koan process will be started (that is, unless you specify —config-only). The installation can be watched the same way one watches any Xen guest. Once it is finished, the guest is started back up to allow the bootstrapping firstboot script to run. This behaves exactly like the normal firstboot script on a Red Hat based system.

Those of ordinary skills in the art will recognize that Cobbler and Koan are described here solely for illustration. Other provisioning modules may be employed.

In accordance with another embodiment, machines that already have an OS can be formed according to the presently describe architecture by following the same bootstrap process as described above without the provisioning process.

Configuration tier 206 allows for a custom configuration of the provisioned machine. FIG. 3 illustrates one embodiment of a configuration tier 302 where Puppet 314 and Git 316 are used to configure a provisioned machine. Puppet 314 is a configuration management tool that can be used to provide container and system configurations that can be deployed into production without modification. Puppet 314 will also free system administrators from many manual steps and enable them to move to a review and release mode.

Git 316 provide source code management. Git 316 is a flexible, distributed, offline source management tool. It addresses some of the shortcomings of our previous solutions and provides support for parallel development, collaboration and the ability to maintain a consistent deployable branch of the source tree. Git's 316 use results in a smaller, cleaner set of changes to source codes.

Those of ordinary skills in the art will recognize that Puppet and Git are solely for illustration purposes. Other types of configuration modules may be used.

Functional tier 208 allows for further orchestration of the configuration of the machine. An orchestration module such as Everest tooling 318 may be used to orchestrate the deployment of the machine via the tools and modules previously described with respect to each tier.

Figure 4:
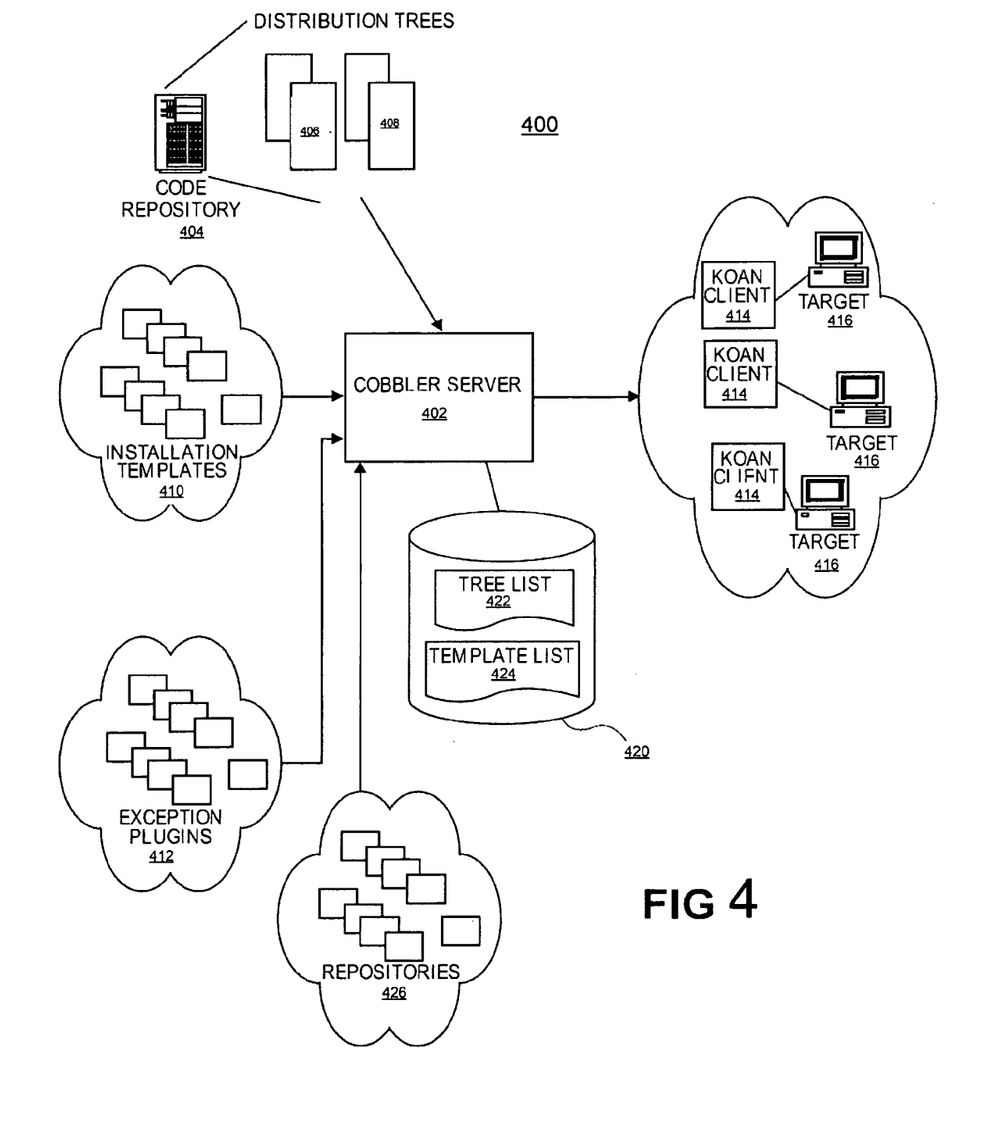
FIG. 4 illustrates a block diagram of one embodiment of a provisioning component of the self-replicating machine of FIG. 3.

FIG. 4 illustrates a block diagram of one embodiment of a provisioning component of the self-replicating machine of FIG. 3. System 400 may comprise a provisioning server 402, a code repository 404 which provides access to distributions 406 and 408, a set of installation templates 410, a set of exception plugins 412, a helper client 414 running on target machines 416, a scheduler 418, a provisioning database 420 which comprises a distribution tree list 422 and template list 424.

Provisioning server (from herein referred to as a "cobbler") 402 is responsible for: serving as a extensible markup language remote procedure call (XMLRPC) handler; linking to or minoring install distribution trees and a configuration database; hosting kickstart templates; and hosting plugins. Cobbler server 402 may be implemented as software, such as Python code, installed on a boot server machine and providing a command line interface for configuration of the boot server. In addition, cobbler server 402 may make itself available as a Python application programming interface (API) for use by higher level management software (not shown). Cobbler server 402 supports provisioning via PXE, virtualization, and re-provisioning. As will be described later, the last two modes are performed with the assistance of a helper client 414.

Code repository 404 is responsible for hosting distributions 406 and 408. Code repository 404 may be implemented using well known components of hardware and software.

Distributions 406 and 408 are bundles of software that are already compiled and configured. Distributions 406 and 408 may be in the form of either rpm, deb, tgz, msi, exe etc. formats. As Linux distributions, distributions 406 and 408 are bundles of software that comprise the Linux kernel, the non-kernel parts of the operating system, and assorted other software. Distributions 406 and 408 may take a variety of forms, from fully-featured desktop and server operating systems to minimal environments.

Installation templates 410 are any data structure or processing element that can be combined with a set of installation configurations and processed to produce a resulting configuration file, such as a kickstart file.

Exception plugins 412 is software that interacts with cobbler server 402 to customize the provisioning of software. In general, exceptions plugins 412 are intended to address infrequent customization needs.

Helper client (known as "koan", which stands for kickstart-over-a-network") 414 may assist cobbler server 402. Koan 414 allows for both network provisioning of new virtualized guests and destructive provisioning of any existing system. When invoked, koan 414 requests profile information from a remote boot server that has been configured with cobbler server 402. In some embodiments, what koan 414 does with the profile data depends on whether it was invoked with—virt or—replace-self.

In addition, koan 414 enables replacing running systems as well as installing virtualized profiles. Koan 414 may also be pushed out to systems automatically from the boot server. In some embodiments, helper client 414 is also written in Python code to accommodate a variety of operating systems, machine architectures, etc.

Target machines 416 represent the particular machines to which software provisioning is directed. Target machines 416 may represent a wide variety of devices.

Although FIG. 4 shows relatively few number of target machines 416, the present invention is capable of managing a wide range environments, such as datacenters with thousands of machines or server pools with just a few machines.

Provisioning database 420 serves as a data storage location for holding data used by cobbler server 402. For example, as shown, provisioning database 420 will typically comprise distribution tree list 422 and template list 424.

Distribution tree list 422 provides an inventory of distributions 406 and 408 that are hosted or mirrored by cobbler server 402. Template list 424 provides an inventory of templates 410 that are hosted by cobbler server 402.

Figure 5:
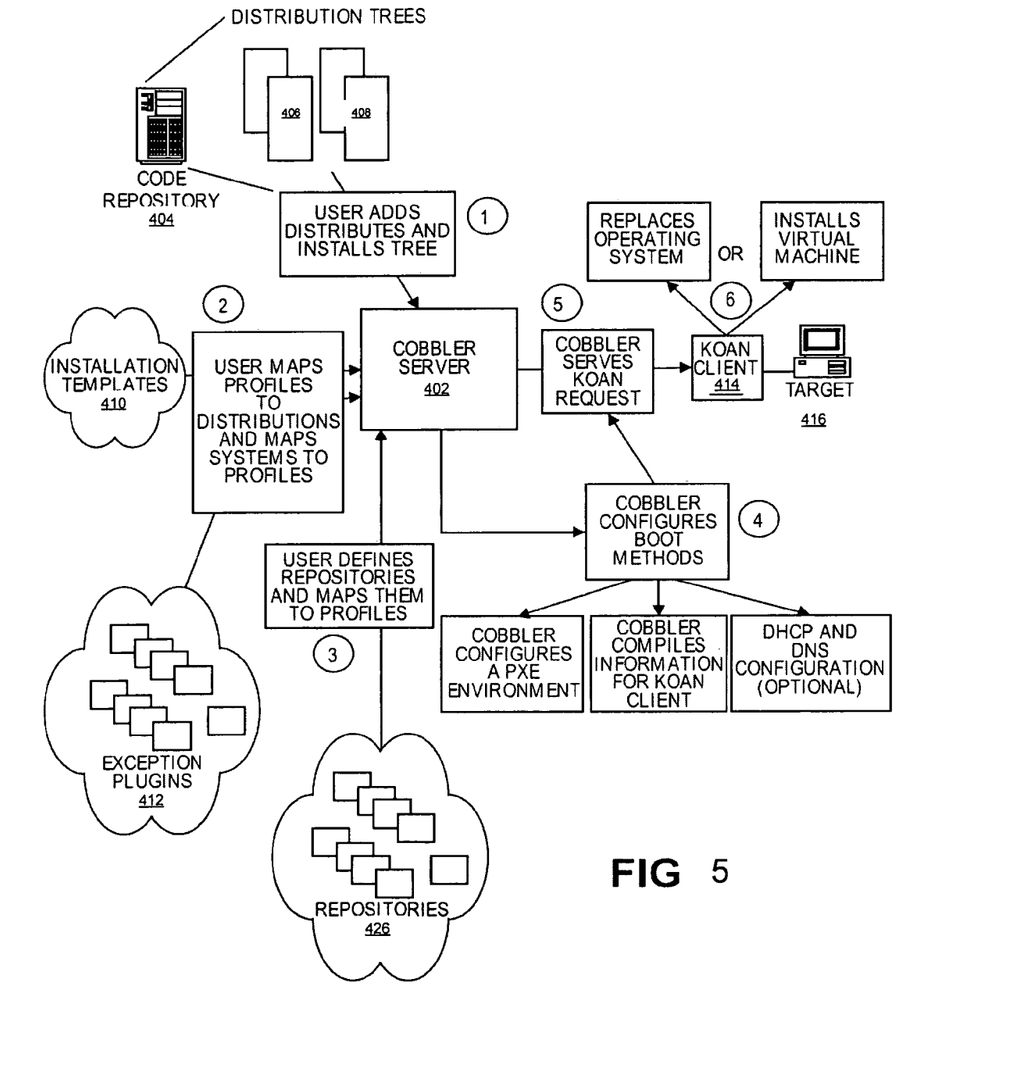
FIG. 5 illustrates a process flow of one embodiment of the provisioning component of the self-replicating machine of FIG. 4.

FIG. 5 illustrates an exemplary process flow of the present invention. As noted, cobbler server 402 provides a unified provisioning environment. Thus, a user may specify various aspects of software provisioning via a single interface, such as a command line interface or other known interface. Some of the phases of specifying software provisioning in a unified environment will now be explained with reference to FIG. 4.

In phase 1, a user may use various commands of the present invention to specify distributions and install trees hosted by code repository 404, such as a distribution from distributions 406 or 408. A user may add or import a distribution or import it from installation media or an external network location.

In phase 2, a user may map profiles to the distributions and map systems to the profiles using profile commands and systems commands of the present invention. As noted above, a profile associates a distribution to additional specialized options, such as a kickstart automation file. In cobbler server 402, profiles are the unit of provisioning and at least one profile exists for every distribution to be provisioned. A profile might represent, for instance, a web server or desktop configuration.

Next, a user may map systems to profiles using system commands of the present invention. In general, systems commands assign a piece of hardware with cobbler server 402 to a profile. Systems can be defined by hostname, Internet Protocol (IP) address, or MAC address. When available, use of the MAC address to assign systems may be preferred.

In phase 3, the user may map repositories and profiles using repository commands of the present invention. In general, repository commands address configurations and tasks related to updating the software, remote installation procedures, and optionally customizing the software. These repository commands may also specify mirroring of the provisioned software. Repository mirroring allows cobbler server 402 to mirror not only install trees 406 and 408, but also optional packages, third party content, and updates. Mirroring may be useful for faster, more up-to-date installations and faster updates, or providing software on restricted networks.

Cobbler server 402 may also include other administrative features, such as allowing the user to view their provisioning configuration or information tracking the status of a requested software installation. For example, the "cobbler sync" can be used to repair or rebuild the contents /tftpboot or /var/www/cobbler when something has changed. The command brings the filesystem up to date with the configuration as understood by cobbler server 402. The cobbler sync function may be run whenever files in /var/www/cobbler are manually edited or when making changes to kickstart files.

In phase 4, cobbler server 402 configures boot methods for the provisioning requested by the user. For example, cobbler server 402 may configure a PXE environment, such as a network card BIOS. Alternatively, cobbler server 402 may compile and configure information for koan client 404. Cobbler server 402 may also optionally configure DHCP and DNS configuration information.

In phase 5, cobbler server 402 serves the request of koan client 414. Koan client 414 may acknowledge the service of information of cobbler server 402 and then may initiate installation of the software being provisioned. Processing now flows to phase 6, in which koan client 414 may either install the requested software, e.g., replace the existing operating system, or install a virtual machine.

Figure 6:
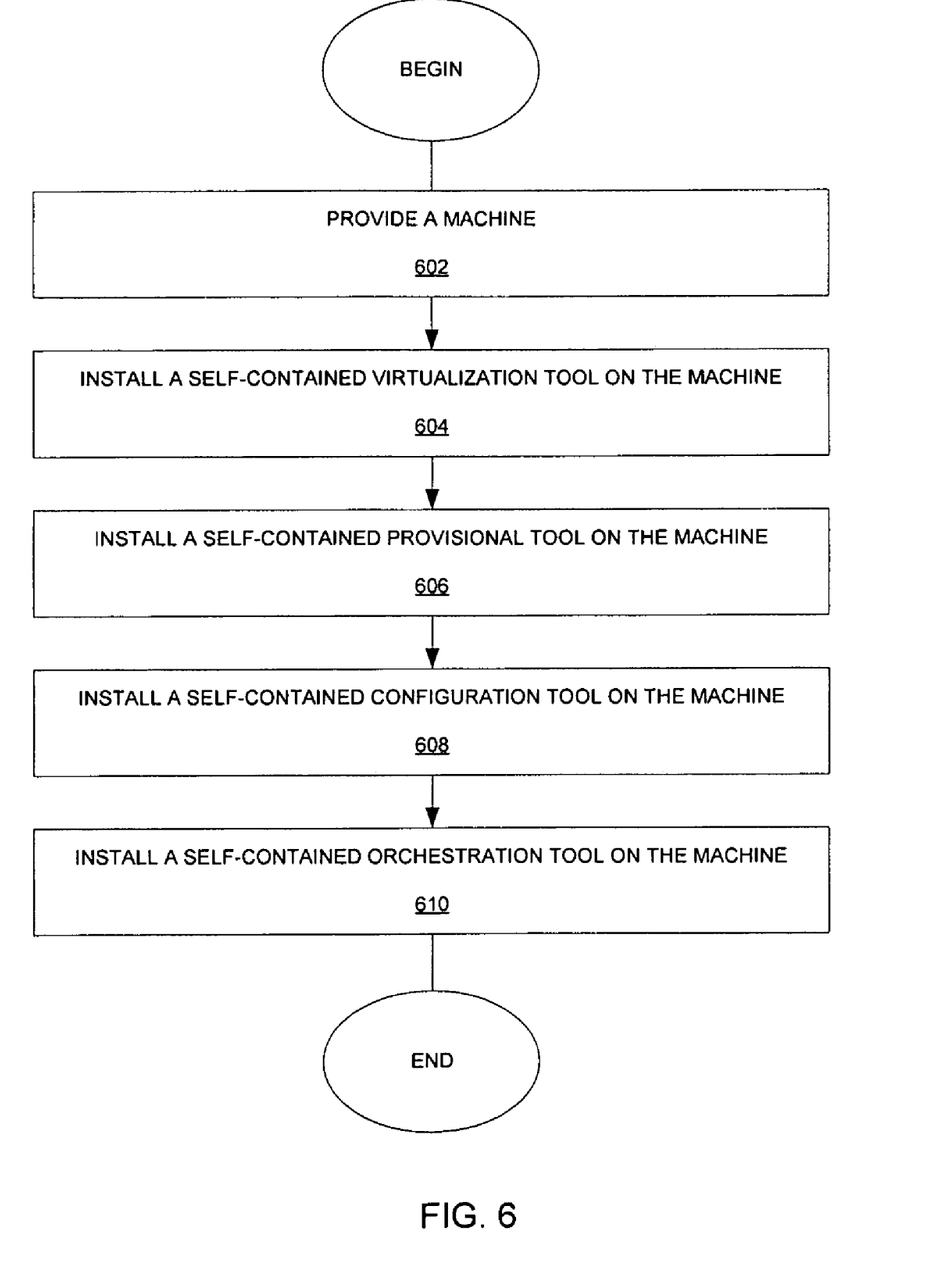
FIG. 6 illustrates a flow diagram of a method for building a self-replicating machine.

FIG. 6 illustrates a flow diagram of a method for building a self-replicating machine. At 602, a machine is provided. In one embodiment, a host machine is provided. The host machine type is used to host Xen guests in the environment. It provides the user with a graphical desktop environment. In another embodiment, a repo machine is provided. Repo machines are the kernel of the present IT architecture. They are self-contained provisioning, configuration, and artifact store. From them, all other machine types can be created. At 604, a self-contained virtualization tool is installed on the machine. In one embodiment, the self-contained virtualization tool includes LVM. In another embodiment, the self-contained virtualization tool includes Xen virtualization. At 606, a self-contained provisioning tool is installed on the machine. In one embodiment, the self-contained provisioning tool includes Cobble and Koan. At 608, a self-contained configuration tool is installed on the machine. In one embodiment, the self-contained configuration tool includes Puppet and Git. At 610, a self-contained orchestration tool is installed on the machine.

In one embodiment, JBoss Enterprise SOA platform is used to provide loose coupling, a messaging infrastructure, process orchestration, protocol translation, adapters, change management, quality of service, quality of protection (encryption and security), and management services. JBoss Seam provides our application framework, unifying and integrating multiple web technologies while reducing complexity for our developers.

Figure 7:
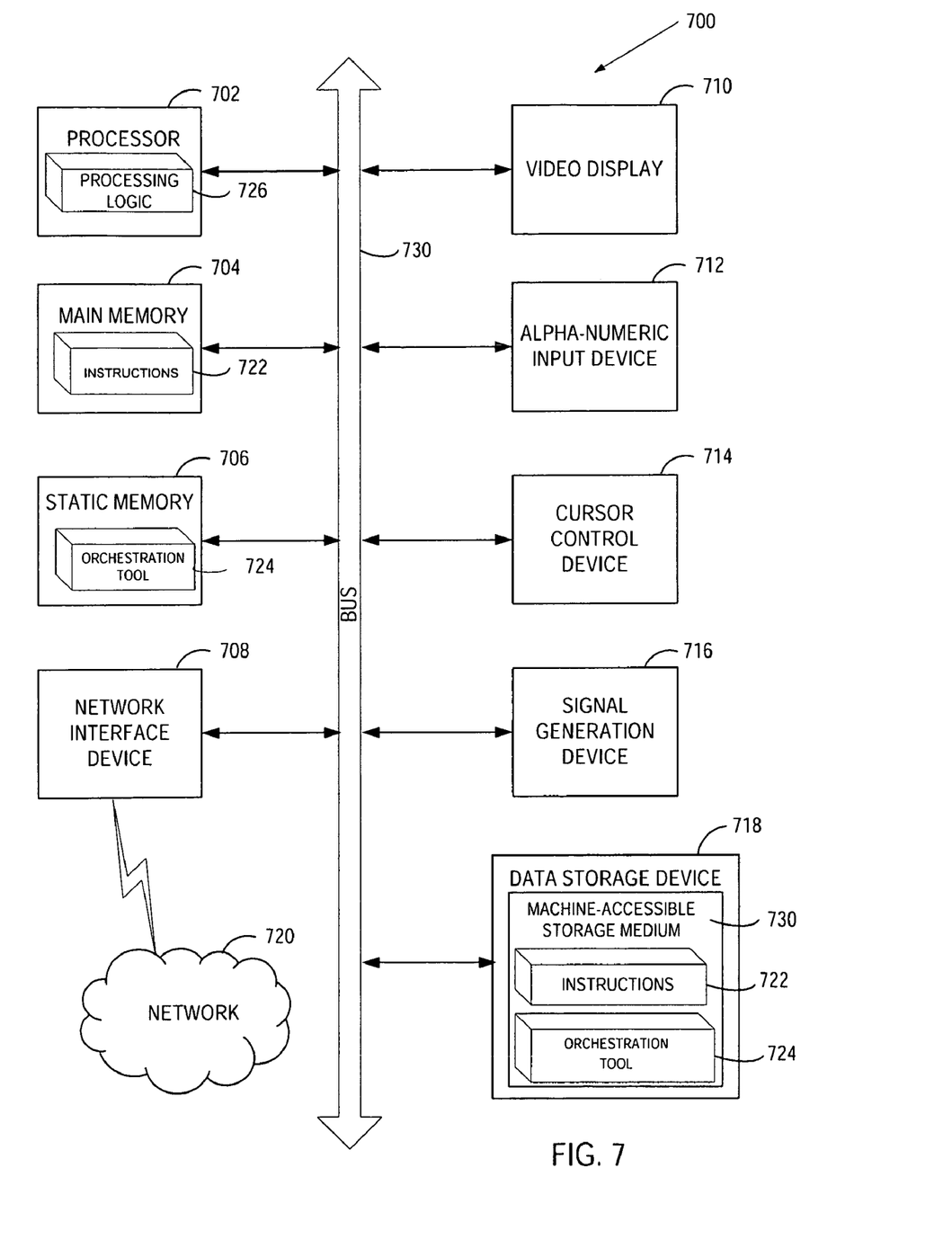
FIG. 7 is a block diagram illustrating an exemplary computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-accessible storage media. The software 722 may further be transmitted or received over a network 720 via the network interface device 708.

The machine-accessible storage medium 730 may also be used to store the self-contained repository and tools 724. The self-contained repository and tools 724 may also be stored in other sections of computer system 700, such as static memory 706.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Figure 8:
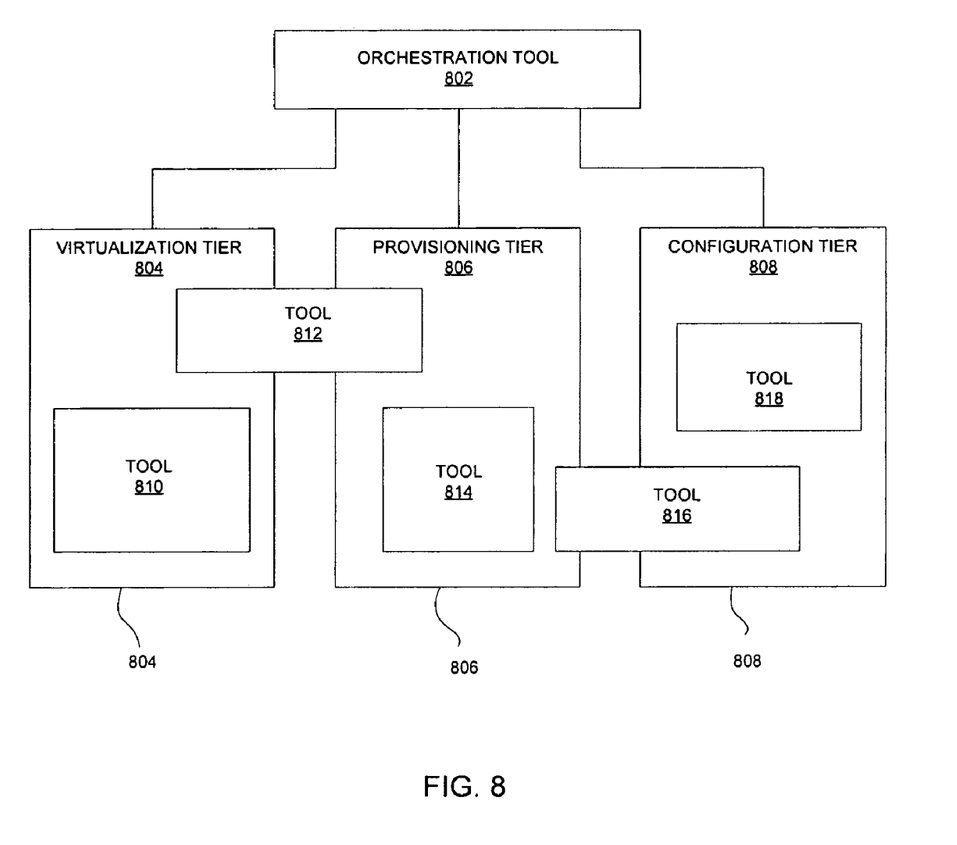
FIG. 8 is a block diagram illustrating one embodiment of an orchestration tool.

FIG. 8 is a block diagram illustrating one embodiment of an orchestration tool 802 also referred to as a configuration management tool. The orchestration tool 802 is configured to orchestrate and automate a deployment process, and to interface with an underlying product having a corresponding functionality. Each tier includes one or more tools associated with the functionality of that tier. For example, virtualization tier 804 includes tools 810, 812. Provisioning tier 806 includes tools 812, 814, 816. Configuration tier 808 includes tools 816, 818.

It should be noted that tool 812 may have several functionalities that can be performed with respect to virtualization tier 804 and provisioning tier 806. Similarly, tool 816 may have several functionalities that can be performed with respect to provisioning tier 806 and configuration tier 808.

In contrast, some tools may have functionalities limited to their respective tiers. For example, tool 810 has functions that can be performed only with respect to virtualization tier 804. Similarly, tool 814 has functions that can be performed only with respect to provisioning tier 806. Tool 818 has functions that can be performed only with respect to configuration tier 808.

At each tier, Orchestration tool only uses the tools for the purpose associated with the functionality of the underlying tier. For example, orchestration tool 802 may interface with tool 810 for virtualization. Alternatively, orchestration tool 802 may interface with tool 812 only with respect to the virtualization function of tool 812.

Similarly, orchestration tool 802 may interface with tool 818 for configuration. Alternatively, orchestration tool 802 may interface with tool 816 only with respect to the configuration function of tool 812. As such, an interaction with the orchestration tool 802 and not directly with the underlying product that provides the functionality allows for the actual product/tool within a tier to be replaced. The IT architecture as presently described is therefore not tied to specific or particular products as mentioned above (Cobbler, Koan, etc. . . . ). Each tool that provided the functionality associated with a tier can therefore be easily replaced.

Figure 9:
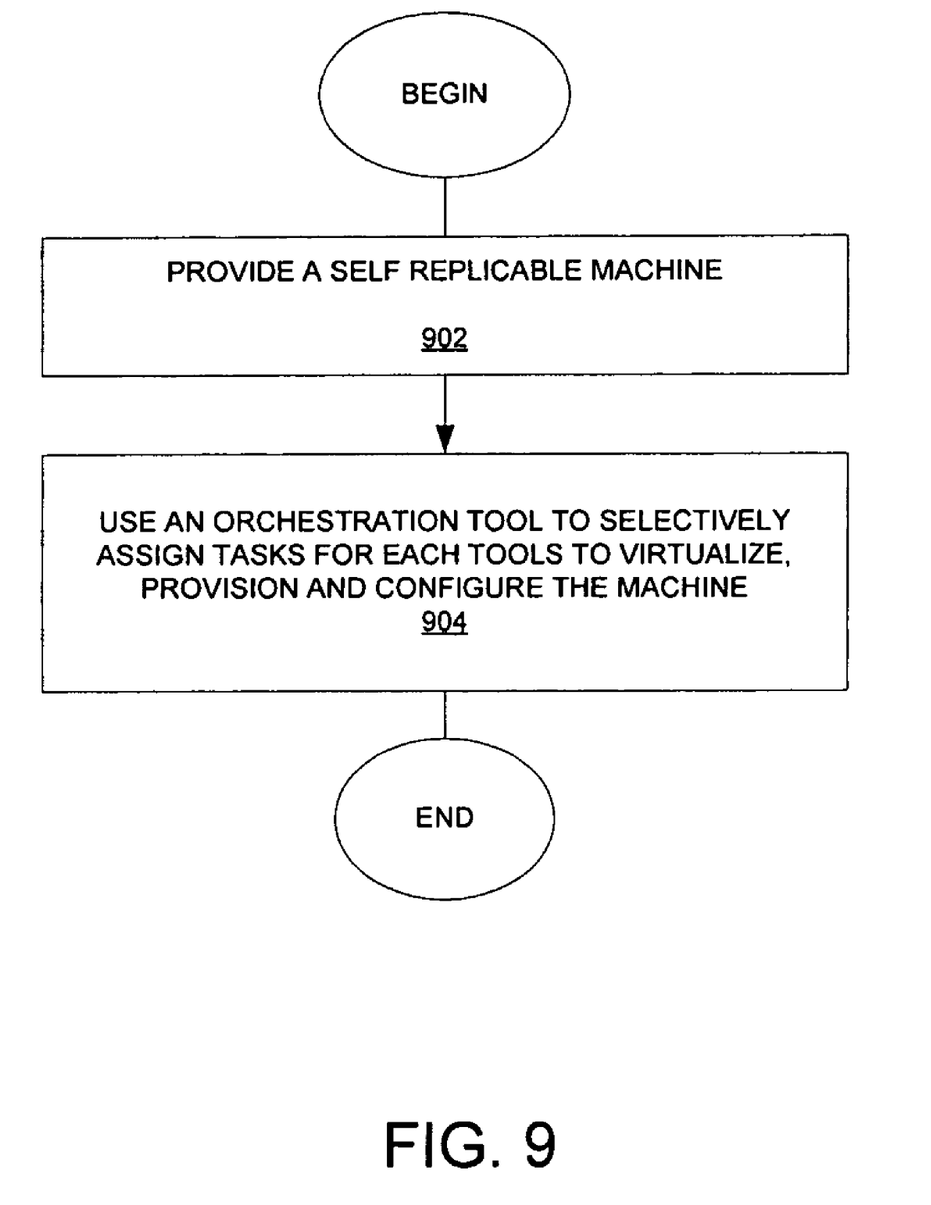
FIG. 9 is a flow diagram illustrating one embodiment of an operation of an orchestration tool.

FIG. 9 is a flow diagram illustrating one embodiment of an operation of an orchestration tool. At 902, a self-contained replicable machine is provided. At 904, an orchestration tool as described above is used to selectively assign tasks to each tool corresponding to a tier (virtualizing, provisioning, and configuring).

In the description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   installing a virtualization tool, a provisioning tool, and a configuration tool, in a distributable self-contained repository of a physical machine; and
   installing a configuration management tool in the distributable self-contained repository, wherein the configuration management tool is to:
      automate a deployment process of software to operate on the physical machine;
      interface with each of the virtualization tool, the provisioning tool, and the configuration tool; and
      assign one or more tasks to each of the virtualization tool, the provisioning tool, and the configuration tool, wherein the one or more tasks configured to, when executed by the corresponding tools, implement the deployment process for the physical machine by:
         executing a bootstrapping process to obtain parameters for the physical machine;
         building one or more virtual machines on the physical machine according to the obtained parameters;
         loading and customizing software on the one or more virtual machines according to the obtained parameters;
         deploying system configurations to the one or more virtual machines according to the obtained parameters; and
         managing a source code of the one or more virtual machines;
   wherein each of the virtualization tool, the provisioning tool, and the configuration tool interact directly with the configuration management tool and not any component of the physical machine that provides a functionality directed by the virtualization tool, the provisioning tool, or the configuration tool in the deployment process.

2. The computer-implemented method of claim 1 wherein the virtualization tool is configured to build the one or more virtual machines on the physical machine, each virtual machine of the one or more virtual machines having a corresponding operating system and environment.

3. The computer-implemented method of claim 2 wherein the provisioning tool is to provision the one or more virtual machines.

4. The computer-implemented method of claim 3 wherein the configuration tool is to configure the one or more provisioned virtual machines.

5. The computer-implemented method of claim 1 wherein the configuration management tool is further to custom configure the physical machine for a user.

6. The computer-implemented method of claim 1 further comprising:
   storing a source code management tool in the distributable self-contained repository, the source code management tool to develop each virtual machine of the one or more virtual machines independently from each other in parallel, and to merge back the developments to a corresponding parent virtual machine.

7. The computer-implemented method of claim 1 wherein the physical machine is able to automatically rebuild itself solely from the tools stored in the distributable self-contained repository.

8. A non-transitory machine-accessible storage medium including data that, when accessed by a machine, cause the machine to perform a method for processing messages comprising:
  installing a virtualization tool, a provisioning tool, and a configuration tool, in a distributable self-contained repository of a physical machine; and
  installing a configuration management tool in the distributable self-contained repository, wherein the configuration management tool is to:
    automate a deployment process of software to operate on the physical machine;
    interface with each of the virtualization tool, the provisioning tool, and the configuration tool; and
    assign one or more tasks to each of the virtualization tool, the provisioning tool, and the configuration tool, wherein the one or more tasks configured to, when executed by the corresponding tools, implement the deployment process for the physical machine by:
      executing a bootstrapping process to obtain parameters for the physical machine;
      building one or more virtual machines on the physical machine according to the obtained parameters;
      loading and customizing software on the one or more virtual machines according to the obtained parameters;
      deploying system configurations to the one or more virtual machines according to the obtained parameters; and
      managing a source code of the one or more virtual machines;
  wherein each of the virtualization tool, the provisioning tool, and the configuration tool interact directly with the configuration management tool and not any component of the physical machine that provides a functionality directed by the virtualization tool, the provisioning tool, or the configuration tool in the deployment process.

9. The non-transitory machine-accessible storage medium of claim 8 wherein each virtual machine of the one or more virtual machines comprises a corresponding operating system and environment.

10. The non-transitory machine-accessible storage medium of claim 9 wherein the provisioning tool is to provision the one or more virtual machines.

11. The non-transitory machine-accessible storage medium of claim 10 wherein the configuration tool is to configure the one or more provisioned virtual machines.

12. The non-transitory machine-accessible storage medium of claim 8 wherein configuration management tool is further to custom configure the physical machine for a user.

13. The non-transitory machine-accessible storage medium of claim 8 wherein the method further comprises:
  storing a source code management tool in the distributable self-contained repository, the source code management tool to develop each virtual machine of the one or more virtual machines independently from each other in parallel, and to merge back the developments to a corresponding parent virtual machine.

14. The non-transitory machine-accessible storage medium of claim 8 wherein the physical machine is able to automatically rebuild itself solely from the tools stored in the distributable self-contained repository.

15. A machine comprising:
  a memory;
  a processing device communicably coupled to the memory;
  a virtualization component executable from the memory by the processing device, the virtualization component to build one or more virtual machines on the machine, each virtual machine having a corresponding operating system and environment;
  a provisioning component coupled to the virtualization component and executable from the memory by the processing device, the provisioning component to provision the one or more virtual machines, each virtual machine having a corresponding operating system and environment;
  a configuration component coupled to the provisioning component and executable from the memory by the processing device, the configuration component to configure one or more provisioned virtual machines; and
  a configuration management tool coupled to the virtualization component, the provisioning component, and the configuration component and executable from the memory by the processing device, the configuration management tool to:
    automate a deployment process of software to operate on the physical machine;
    interface with each of the virtualization tool, the provisioning tool, and the configuration tool; and
    assign one or more tasks to each of the virtualization tool, the provisioning tool, and the configuration tool, wherein the one or more tasks configured to, when executed by the corresponding tools, implement the deployment process for the physical machine by:
      executing a bootstrapping process to obtain parameters for the physical machine;
      building one or more virtual machines on the physical machine according to the obtained parameters;
      loading and customizing software on the one or more virtual machines according to the obtained parameters;
      deploying system configurations to the one or more virtual machines according to the obtained parameters; and
      managing a source code of the one or more virtual machines;
  wherein each of the virtualization tool, the provisioning tool, and the configuration tool interact directly with the configuration management tool and not any component of the physical machine that provides a functionality directed by the virtualization tool, the provisioning tool, or the configuration tool in the deployment process.

16. The machine of claim 15 wherein the machine is able to automatically rebuild itself solely from the virtualization tool, the provisioning tool, and the configuration tool.

17. The machine of claim 16 wherein the configuration management tool is further to custom configure a virtual machine of the one or more virtual machines for a user.

18. The machine of claim 16 further comprising:
  a source code management tool configured to develop each virtual machine of the one or more virtual machines independently from each other in parallel, and to merge back the developments to a corresponding parent virtual machine.

19. The machine of claim 15 further comprising:
  a distributable self-contained repository to store the virtualization component, the provisioning component, the configuration component, and the configuration management tool.

20. The machine of claim 15 wherein the machine is an LDAP server operating on a Linux operating system.

* * * * *